US007815502B2

(12) United States Patent
Hardy et al.

(10) Patent No.: US 7,815,502 B2
(45) Date of Patent: Oct. 19, 2010

(54) METHOD AND APPARATUS FOR CONDUCTING A GAME OF CHANCE

(75) Inventors: Dow Hardy, Marlborough, MA (US); Mark E. Herrmann, Wellesley, MA (US); Steven N. Kane, Brookline, MA (US)

(73) Assignee: GameLogic Inc., Waltham, MA (US)

(*) Notice: Subject to any disclaimer, the term of this patent is extended or adjusted under 35 U.S.C. 154(b) by 2 days.

(21) Appl. No.: 11/647,528

(22) Filed: Dec. 28, 2006

(65) Prior Publication Data

US 2007/0259708 A1 Nov. 8, 2007

Related U.S. Application Data

(63) Continuation-in-part of application No. 11/001,775, filed on Nov. 30, 2004.

(60) Provisional application No. 60/569,030, filed on May 7, 2004, provisional application No. 60/754,484, filed on Dec. 28, 2005.

(51) Int. Cl.

*A63F 9/24* (2006.01)
*A63F 13/00* (2006.01)
*G06F 17/00* (2006.01)
*G06F 19/00* (2006.01)

(52) U.S. Cl. ............................ 463/16; 463/20; 463/25; 463/42

(58) Field of Classification Search .................. 463/16, 463/20, 25, 42

See application file for complete search history.

(56) References Cited

U.S. PATENT DOCUMENTS 2,544,961 A 3/1951 Kemp
4,215,864 A 8/1980 Nichols
4,494,197 A 1/1985 Troy et al.
4,582,324 A 4/1986 Koza et al.
4,679,789 A 7/1987 Okada
4,689,742 A 8/1987 Troy et al.
4,725,079 A 2/1988 Koza et al.
4,764,666 A 8/1988 Bergeron
4,856,787 A 8/1989 Itkis
4,882,473 A 11/1989 Bergeron et al.
4,922,522 A 5/1990 Scanlon (Continued)

FOREIGN PATENT DOCUMENTS

EP 1746550 A2 1/2007
EP 1762990 A2 3/2007
EP 1833014 A1 9/2007
WO WO 91/06931 5/1991
WO WO 97/37737 10/1997

(Continued)

OTHER PUBLICATIONS

Rules of Pai Gow Poker. Casino City. Dec. 3, 2000. Online: http://web.archive.org/web/20001203170300/http://www.casinocity.com/rule/paigow.htm.

(Continued)

*Primary Examiner*—Dmitry Suhol
*Assistant Examiner*—Wei Li
(74) *Attorney, Agent, or Firm*—Lando & Anastasi, LLP

(57) ABSTRACT

The field of the invention relates generally to lotteries and gaming, and more particularly, to systems for conducting casino-based gaming. After a player subscribes to play multiple games on a video gaming machine, the player may choose to finish playing the games elsewhere. The video gaming machine may then determine the outcomes for the games yet to be played and then may issue a ticket to the player.

20 Claims, 7 Drawing Sheets

U.S. PATENT DOCUMENTS

| | | | | |
|---|---|---|---|---|
| 5,158,293 | A | 10/1992 | Mullins | |
| 5,324,035 | A | 6/1994 | Morris et al. | |
| 5,351,970 | A | 10/1994 | Fioretti | |
| 5,373,440 | A | 12/1994 | Cohen | |
| 5,377,975 | A | 1/1995 | Clapper, Jr. | |
| 5,398,932 | A | 3/1995 | Eberhardt et al. | |
| 5,429,361 | A | 7/1995 | Raven | |
| 5,518,253 | A | 5/1996 | Pocock et al. | |
| 5,569,082 | A | 10/1996 | Kaye | |
| 5,586,937 | A | 12/1996 | Menashe | |
| 5,611,729 | A | 3/1997 | Schumacher | |
| 5,628,684 | A | 5/1997 | Bouedec | |
| 5,645,485 | A | 7/1997 | Clapper, Jr. | |
| 5,653,635 | A | 8/1997 | Breeding | |
| 5,709,603 | A | 1/1998 | Kaye | |
| 5,722,891 | A | 3/1998 | Inoue | |
| 5,749,784 | A | 5/1998 | Clapper, Jr. | |
| 5,768,382 | A | 6/1998 | Schneier et al. | |
| 5,772,511 | A | 6/1998 | Smeltzer | |
| 5,779,549 | A | 7/1998 | Walker | |
| 5,788,573 | A | 8/1998 | Baerlocher et al. | |
| 5,791,990 | A | 8/1998 | Schroeder et al. | |
| 5,791,991 | A | 8/1998 | Small | |
| 5,810,664 | A | 9/1998 | Clapper, Jr. | |
| 5,816,918 | A | 10/1998 | Kelly et al. | |
| 5,823,873 | A | 10/1998 | Moody | |
| 5,823,874 | A | 10/1998 | Adams | |
| 5,830,069 | A | 11/1998 | Soltesz et al. | |
| 5,848,932 | A | 12/1998 | Adams | |
| 5,860,653 | A | 1/1999 | Jacobs | |
| 5,871,398 | A | 2/1999 | Schneier et al. | |
| 5,882,258 | A | 3/1999 | Kelly et al. | |
| 5,887,906 | A | 3/1999 | Sultan | |
| 5,928,082 | A | 7/1999 | Clapper, Jr. et al. | |
| 5,944,606 | A | 8/1999 | Gerow | |
| 5,954,582 | A | 9/1999 | Zach et al. | |
| 5,980,385 | A | 11/1999 | Clapper | |
| 5,996,997 | A | 12/1999 | Kamille | |
| 6,007,426 | A | 12/1999 | Kelly et al. | |
| 6,012,983 | A | 1/2000 | Walker et al. | |
| 6,015,344 | A | 1/2000 | Kelly et al. | |
| 6,024,640 | A * | 2/2000 | Walker et al. | 463/17 |
| 6,028,920 | A | 2/2000 | Carson | |
| 6,044,135 | A | 3/2000 | Katz | |
| 6,048,269 | A | 4/2000 | Burns et al. | |
| 6,056,289 | A | 5/2000 | Clapper | |
| 6,059,289 | A | 5/2000 | Vancura | |
| 6,077,163 | A | 6/2000 | Walker et al. | |
| 6,106,393 | A | 8/2000 | Sunaga et al. | |
| 6,113,495 | A | 9/2000 | Walker et al. | |
| 6,146,272 | A | 11/2000 | Walker et al. | |
| 6,152,823 | A | 11/2000 | Lacoste et al. | |
| 6,159,097 | A | 12/2000 | Gura | |
| 6,162,121 | A | 12/2000 | Morro et al. | |
| 6,168,521 | B1 | 1/2001 | Luciano et al. | |
| 6,173,267 | B1 | 1/2001 | Cairns | |
| 6,179,711 | B1 | 1/2001 | Yoseloff | |
| 6,186,892 | B1 | 2/2001 | Frank et al. | |
| 6,203,011 | B1 | 3/2001 | Nulph et al. | |
| 6,203,427 | B1 | 3/2001 | Walker et al. | |
| 6,236,900 | B1 | 5/2001 | Geiger | |
| 6,241,606 | B1 | 6/2001 | Riendeau et al. | |
| 6,244,958 | B1 | 6/2001 | Acres et al. | |
| 6,251,017 | B1 | 6/2001 | Leason et al. | |
| 6,270,406 | B1 | 8/2001 | Sultan | |
| 6,273,817 | B1 | 8/2001 | Sultan | |
| 6,279,911 | B1 | 8/2001 | Cherry | |
| 6,280,325 | B1 | 8/2001 | Fisk | |
| RE37,371 | E | 9/2001 | Gerow | |
| 6,283,855 | B1 | 9/2001 | Bingham | |
| 6,302,793 | B1 | 10/2001 | Fertitta et al. | |
| 6,309,298 | B1 | 10/2001 | Gerow | |
| 6,311,976 | B1 | 11/2001 | Yoseloff et al. | |
| 6,312,334 | B1 | 11/2001 | Yoseloff | |
| 6,358,151 | B1 | 3/2002 | Enzminger et al. | |
| 6,364,765 | B1 | 4/2002 | Walker et al. | |
| 6,364,766 | B1 | 4/2002 | Anderson | |
| 6,368,214 | B1 | 4/2002 | Luciano | |
| 6,368,218 | B2 | 4/2002 | Angell, Jr. | |
| 6,371,852 | B1 | 4/2002 | Acres | |
| 6,375,567 | B1 | 4/2002 | Acres | |
| 6,390,921 | B1 | 5/2002 | Busch et al. | |
| 6,394,902 | B1 | 5/2002 | Glavich et al. | |
| 6,402,614 | B1 | 6/2002 | Schneier et al. | |
| 6,439,995 | B1 | 8/2002 | Hughs-Baird et al. | |
| 6,471,208 | B2 | 10/2002 | Yoseloff et al. | |
| 6,488,280 | B1 | 12/2002 | Katz et al. | |
| 6,514,144 | B2 | 2/2003 | Riendeau et al. | |
| 6,523,829 | B1 | 2/2003 | Walker et al. | |
| 6,527,175 | B1 | 3/2003 | Dietz et al. | |
| 6,540,230 | B1 | 4/2003 | Walker et al. | |
| 6,565,084 | B1 | 5/2003 | Katz et al. | |
| 6,572,106 | B2 | 6/2003 | Alexoff et al. | |
| 6,572,107 | B1 | 6/2003 | Walker et al. | |
| 6,575,832 | B1 | 6/2003 | Manfredi et al. | |
| 6,582,307 | B2 | 6/2003 | Webb | |
| 6,582,310 | B1 | 6/2003 | Walker et al. | |
| 6,588,747 | B1 | 7/2003 | Seelig | |
| 6,599,187 | B2 | 7/2003 | Gerow | |
| 6,599,192 | B1 | 7/2003 | Baerlocher et al. | |
| 6,607,439 | B2 | 8/2003 | Schneier et al. | |
| 6,612,501 | B1 | 9/2003 | Woll et al. | |
| 6,612,574 | B1 | 9/2003 | Cole et al. | |
| 6,619,660 | B2 | 9/2003 | Schaefer et al. | |
| 6,620,046 | B2 | 9/2003 | Rowe | |
| 6,625,578 | B2 | 9/2003 | Spaur et al. | |
| 6,645,074 | B2 | 11/2003 | Thomas et al. | |
| 6,645,075 | B1 * | 11/2003 | Gatto et al. | 463/25 |
| 6,656,042 | B2 | 12/2003 | Reiss et al. | |
| 6,663,105 | B1 | 12/2003 | Sullivan et al. | |
| 6,676,126 | B1 | 1/2004 | Walker et al. | |
| 6,679,497 | B2 | 1/2004 | Walker et al. | |
| 6,681,995 | B2 | 1/2004 | Sukeda et al. | |
| 6,682,419 | B2 | 1/2004 | Webb et al. | |
| D486,869 | S | 2/2004 | Webb et al. | |
| 6,685,561 | B2 | 2/2004 | Anderson et al. | |
| 6,692,353 | B2 | 2/2004 | Walker et al. | |
| 6,705,944 | B2 | 3/2004 | Luciano | |
| 6,716,103 | B1 | 4/2004 | Eck et al. | |
| 6,719,631 | B1 | 4/2004 | Tulley et al. | |
| 6,729,956 | B2 | 5/2004 | Wolf et al. | |
| 6,733,385 | B1 | 5/2004 | Enzminger et al. | |
| 6,736,324 | B2 | 5/2004 | Behm | |
| 6,749,198 | B2 | 6/2004 | Katz et al. | |
| 6,761,633 | B2 | 7/2004 | Riendeau et al. | |
| 6,786,824 | B2 | 9/2004 | Cannon | |
| 6,811,484 | B2 | 11/2004 | Katz et al. | |
| 6,824,467 | B2 | 11/2004 | Schlottmann et al. | |
| 6,843,724 | B2 | 1/2005 | Walker et al. | |
| 6,852,031 | B1 | 2/2005 | Rowe et al. | |
| 6,855,052 | B2 | 2/2005 | Weiss et al. | |
| 6,896,619 | B2 | 5/2005 | Baltz | |
| 6,899,622 | B2 | 5/2005 | Lind et al. | |
| 6,910,968 | B2 | 6/2005 | Nassef et al. | |
| 6,913,534 | B2 | 7/2005 | DeFrees-Parrott | |
| 6,918,589 | B2 | 7/2005 | Thibault | |
| 6,929,544 | B2 | 8/2005 | Osterer | |
| 6,934,846 | B2 | 8/2005 | Szrek | |
| 6,942,570 | B2 | 9/2005 | Schneier et al. | |
| 6,969,319 | B2 | 11/2005 | Rowe et al. | |
| 7,008,317 | B2 | 3/2006 | Cote et al. | |
| 7,008,318 | B2 | 3/2006 | Schneier et al. | |
| 7,024,375 | B2 | 4/2006 | Chau | |
| 7,052,394 | B2 | 5/2006 | Walker et al. | |

| | | | | |
|---|---|---|---|---|
| 7,073,720 | B2 | 7/2006 | Behm | |
| 7,112,135 | B2 | 9/2006 | Anderson | |
| 7,118,478 | B2* | 10/2006 | Fayter et al. | 463/25 |
| 7,163,459 | B2 | 1/2007 | Tanskanen et al. | |
| 7,172,506 | B2 | 2/2007 | Baerlocher et al. | |
| 7,179,168 | B1 | 2/2007 | Tulley et al. | |
| 7,186,180 | B2 | 3/2007 | Lathrop | |
| 7,213,811 | B2 | 5/2007 | Bozeman | |
| 7,275,990 | B2 | 10/2007 | Walker et al. | |
| 7,285,045 | B2 | 10/2007 | Schneier et al. | |
| 7,294,058 | B1 | 11/2007 | Slomiany et al. | |
| 7,303,468 | B2 | 12/2007 | Schneier et al. | |
| 7,303,470 | B2 | 12/2007 | George et al. | |
| 7,311,599 | B2 | 12/2007 | Knapp | |
| 7,357,393 | B2 | 4/2008 | Finocchio | |
| 7,416,484 | B1 | 8/2008 | Nelson | |
| 2001/0046891 | A1 | 11/2001 | Acres | |
| 2001/0049305 | A1 | 12/2001 | Riendeau et al. | |
| 2002/0010015 | A1 | 1/2002 | Acres | |
| 2002/0013167 | A1 | 1/2002 | Spaur et al. | |
| 2002/0039923 | A1 | 4/2002 | Cannon et al. | |
| 2002/0042300 | A2 | 4/2002 | Acres et al. | |
| 2002/0052229 | A1 | 5/2002 | Halliburton et al. | |
| 2002/0061778 | A1 | 5/2002 | Acres | |
| 2002/0077173 | A1 | 6/2002 | Luciano et al. | |
| 2002/0090986 | A1 | 7/2002 | Cote et al. | |
| 2002/0090987 | A1 | 7/2002 | Walker et al. | |
| 2002/0093190 | A1 | 7/2002 | Katz | |
| 2002/0098882 | A1 | 7/2002 | Lind et al. | |
| 2002/0107072 | A1 | 8/2002 | Giobbi et al. | |
| 2002/0147040 | A1 | 10/2002 | Walker et al. | |
| 2002/0152120 | A1 | 10/2002 | Howington et al. | |
| 2002/0155885 | A1 | 10/2002 | Shvili | |
| 2002/0169018 | A1 | 11/2002 | Schneier et al. | |
| 2002/0187827 | A1 | 12/2002 | Blankstein | |
| 2002/0193158 | A1 | 12/2002 | Weiss et al. | |
| 2002/0198038 | A1 | 12/2002 | Adams | |
| 2003/0013531 | A1 | 1/2003 | Rowe et al. | |
| 2003/0027628 | A1 | 2/2003 | Luciano | |
| 2003/0032473 | A1 | 2/2003 | Rowe et al. | |
| 2003/0032474 | A1 | 2/2003 | Kaminkow | |
| 2003/0032476 | A1 | 2/2003 | Walker et al. | |
| 2003/0045340 | A1 | 3/2003 | Roberts | |
| 2003/0047869 | A1 | 3/2003 | Walker et al. | |
| 2003/0060257 | A1 | 3/2003 | Katz et al. | |
| 2003/0060261 | A1 | 3/2003 | Katz et al. | |
| 2003/0069068 | A1 | 4/2003 | Kaminkow | |
| 2003/0080508 | A1 | 5/2003 | Thibault | |
| 2003/0102625 | A1 | 6/2003 | Katz et al. | |
| 2003/0114217 | A1 | 6/2003 | Walker et al. | |
| 2003/0119581 | A1 | 6/2003 | Cannon et al. | |
| 2003/0139214 | A1 | 7/2003 | Wolf et al. | |
| 2003/0155715 | A1 | 8/2003 | Walker et al. | |
| 2003/0157977 | A1 | 8/2003 | Thomas et al. | |
| 2003/0162588 | A1 | 8/2003 | Brosnan | |
| 2003/0171986 | A1 | 9/2003 | Itkis | |
| 2003/0176210 | A1 | 9/2003 | Vancura et al. | |
| 2003/0176212 | A1 | 9/2003 | Schlottmann et al. | |
| 2003/0184012 | A1 | 10/2003 | Green | |
| 2003/0186739 | A1 | 10/2003 | Paulsen et al. | |
| 2003/0195841 | A1 | 10/2003 | Ginsberg et al. | |
| 2003/0199318 | A1 | 10/2003 | Nassef et al. | |
| 2003/0218303 | A1 | 11/2003 | Walker et al. | |
| 2003/0220138 | A1* | 11/2003 | Walker et al. | 463/25 |
| 2004/0025190 | A1 | 2/2004 | McCalla et al. | |
| 2004/0036212 | A1 | 2/2004 | Walker et al. | |
| 2004/0038723 | A1 | 2/2004 | Schneier et al. | |
| 2004/0051240 | A1 | 3/2004 | Adams | |
| 2004/0053683 | A1 | 3/2004 | Hartl et al. | |
| 2004/0063484 | A1 | 4/2004 | Dreaper et al. | |
| 2004/0092307 | A1 | 5/2004 | George et al. | |
| 2004/0102238 | A1 | 5/2004 | Taylor | |
| 2004/0102239 | A1 | 5/2004 | Samila | |
| 2004/0127279 | A1 | 7/2004 | Gatto et al. | |
| 2004/0133472 | A1 | 7/2004 | Leason et al. | |
| 2004/0142741 | A1 | 7/2004 | Walker et al. | |
| 2004/0147308 | A1 | 7/2004 | Walker et al. | |
| 2004/0152504 | A1 | 8/2004 | Herrmann et al. | |
| 2004/0152510 | A1 | 8/2004 | Herrmann | |
| 2004/0180722 | A1 | 9/2004 | Giobbi et al. | |
| 2004/0185930 | A1 | 9/2004 | Thomas et al. | |
| 2004/0204222 | A1 | 10/2004 | Roberts | |
| 2004/0214628 | A1 | 10/2004 | Boyd et al. | |
| 2004/0229671 | A1 | 11/2004 | Stronach et al. | |
| 2004/0259629 | A1 | 12/2004 | Michaelson et al. | |
| 2004/0259631 | A1 | 12/2004 | Katz et al. | |
| 2005/0037841 | A1 | 2/2005 | de Waal | |
| 2005/0049042 | A1 | 3/2005 | Walker et al. | |
| 2005/0075158 | A1 | 4/2005 | Walker et al. | |
| 2005/0090314 | A1 | 4/2005 | Nassef, Jr. et al. | |
| 2005/0092839 | A1 | 5/2005 | Oram | |
| 2005/0124407 | A1 | 6/2005 | Rowe et al. | |
| 2005/0164779 | A1* | 7/2005 | Okuniewicz | 463/25 |
| 2005/0170881 | A1* | 8/2005 | Muskin | 463/20 |
| 2005/0187005 | A1 | 8/2005 | Rose et al. | |
| 2005/0258596 | A1 | 11/2005 | Such | |
| 2005/0282619 | A1 | 12/2005 | Vancura et al. | |
| 2005/0282626 | A1 | 12/2005 | Manfredi et al. | |
| 2005/0288088 | A1 | 12/2005 | Englman et al. | |
| 2006/0025219 | A1 | 2/2006 | Nassef, Jr. et al. | |
| 2006/0035696 | A1 | 2/2006 | Walker et al. | |
| 2006/0036450 | A1 | 2/2006 | Nassef, Jr. et al. | |
| 2006/0041586 | A1 | 2/2006 | Nassef, Jr. et al. | |
| 2006/0068893 | A1 | 3/2006 | Jaffe et al. | |
| 2006/0073884 | A1 | 4/2006 | Walker et al. | |
| 2006/0089194 | A1 | 4/2006 | Joshi et al. | |
| 2006/0148562 | A1 | 7/2006 | Walker et al. | |
| 2006/0194631 | A1 | 8/2006 | Rowe et al. | |
| 2006/0205511 | A1 | 9/2006 | Thomas et al. | |
| 2006/0247035 | A1 | 11/2006 | Rowe et al. | |
| 2007/0054729 | A1 | 3/2007 | Hornik et al. | |
| 2007/0060261 | A1 | 3/2007 | Gomez et al. | |
| 2007/0060274 | A1 | 3/2007 | Rowe et al. | |
| 2007/0060317 | A1 | 3/2007 | Martin et al. | |
| 2007/0060329 | A1 | 3/2007 | Martin et al. | |
| 2007/0060330 | A1 | 3/2007 | Martin et al. | |
| 2007/0060331 | A1 | 3/2007 | Martin et al. | |
| 2007/0060369 | A1 | 3/2007 | Martin et al. | |
| 2007/0087834 | A1 | 4/2007 | Moser et al. | |
| 2007/0167216 | A1 | 7/2007 | Walker et al. | |
| 2007/0173322 | A1 | 7/2007 | Swamy et al. | |
| 2007/0265062 | A1 | 11/2007 | Thomas et al. | |
| 2008/0032763 | A1 | 2/2008 | Giobbi et al. | |
| 2008/0039171 | A1 | 2/2008 | Slomiany et al. | |
| 2008/0039173 | A1 | 2/2008 | Walther et al. | |
| 2008/0287176 | A1 | 11/2008 | Bennett | |

FOREIGN PATENT DOCUMENTS

| | | |
|---|---|---|
| WO | WO 99/10057 | 3/1999 |
| WO | WO 99/16519 | 4/1999 |
| WO | WO 00/43087 | 7/2000 |
| WO | WO 00/69535 | 11/2000 |
| WO | WO 01/14029 | 3/2001 |
| WO | WO 03/004118 | 1/2003 |
| WO | WO 03/061795 | 7/2003 |
| WO | WO 03/084625 | 10/2003 |
| WO | WO 03/089077 | 10/2003 |
| WO | WO 03/089082 | 10/2003 |
| WO | WO 2004/013820 | 2/2004 |
| WO | WO 2004/114073 | 12/2004 |
| WO | WO 2005/029279 | 3/2005 |
| WO | WO 2005/031666 | 4/2005 |
| WO | WO 2005/079242 | 9/2005 |
| WO | WO 2006/028820 | 3/2006 |
| WO | WO 2006/052469 | 5/2006 |

| | | |
|---|---|---|
| WO | WO 2007/035618 | 3/2007 |
| WO | WO 2007/040707 | 4/2007 |
| WO | WO 2007/076321 | 7/2007 |
| WO | WO 2007/145999 | 12/2007 |
| WO | WO 2008/014334 | 1/2008 |
| WO | WO 2008/022083 | 2/2008 |
| WO | WO 2008/022084 | 2/2008 |

OTHER PUBLICATIONS

H.X. Mel and Doris Baker, Cryptography Decrypted, 2001 Addison Wesly, chapters 9 to 12.

Virginia Lottery games, downloaded from www.archive.org, Apr. 29, 2007.

Pop Cap Games, Bejeweled, Feb. 3, 2005, http://web.archive.org/web/20050203202244/http://www.go2share.net/game/bejeweled/index.htm.

John Scarne, Scarne's Complete Guide to Gambling, 1961, Simon & Schuster, New York, chapter 4 on lotteries, pp. 125-126.

Wikipedia, "Wheel of Fortune (US Game Show)" Wikipedia, Nov. 13, 2007 <http://en.wikipedia.org/wiki/Wheel_of_Fortune_%28US_game_show%29>.

New Jersey, State Of, "Wheel of Fortune" New Jersey Lottery, Nov. 13, 2007 <http://www.state.nj.us/lottery/instant/ig409.htm>.

New Jersey, State Of, "Lots O' Spots Bingo" New Jersey Lottery, Dec. 6, 2007 <http://www.state.nj.us/lottery/instant/ig340.htm>.

http://www.powerball.com/powerball/pb_howtoplay.asp, accessed Sep. 14, 2008, All.

Written opinion of the international searching authority (international application No. PCT/US07/76224).

Examiner's first report on patent application No. 2003298941.

* cited by examiner

METHOD AND APPARATUS FOR CONDUCTING A GAME OF CHANCE

RELATED APPLICATIONS

This application is a continuation-in-part of, and claims priority under 35 U.S.C. §120 to, U.S. application Ser. No. 11/001,775 entitled "METHOD AND APPARATUS FOR CONDUCTING A GAME OF CHANCE," filed on Nov. 30, 2004, which claims priority under 35 U.S.C. §119(e) to U.S. Provisional Application Ser. No. 60/569,030, entitled "METHOD AND APPARATUS FOR CONDUCTING A GAME OF CHANCE," filed on May 7, 2004. Both of these applications are herein incorporated by reference in their entirety. This application also claims priority under 35 U.S.C. §119(e) to U.S. Provisional Application Ser. No. 60/754,484, entitled "METHOD AND APPARATUS FOR CONDUCTING A GAME OF CHANCE," filed on Dec. 28, 2005, which is incorporated by reference in its entirety.

FIELD OF THE INVENTION

The field of the invention relates generally to lotteries and gaming, and more particularly, to systems for conducting casino-based gaming.

SUMMARY

Video gaming machines are used to play electronic games of skill or chance. A game of skill is a game that requires a player to use skill, such as dexterity or intelligence, to help determine the outcome of a game. Typical games of skill include video poker, video blackjack, and most arcade-type games including PacMan, Collapse, and Tetris. A game of chance is a game that requires no skill by a player and the outcome of the game is determined completely randomly. Typical games of chance include lotteries, keno, slot machine games, and baccarat. Video gaming machines may be located in any venue but are typically located in casinos, at racetracks, or at home.

Prior to a game session at a casino, a game player needs to pay for playing a video gaming machine. Typically, a game player pays using money or loyalty points. In particular, a game player pays using money by debit card, credit card, check, cash (coins, bills, or tokens) using an account credit either with the gaming operator or an affiliated organization. Alternatively, a game player pays using loyalty points from an account held either by the gaming operator or by an affiliated organization. Loyalty points are often obtained from any type of organization but are generally associated with loyalty programs such as frequent flier programs for airlines, frequent stay programs for hotels or frequent visitor programs for casinos. The game player usually pays on the video gaming machine itself, using a cash machine or kiosk, or through a cashier. A player often also subscribes to play multiple game sessions. That is, the player pays at one time to play many game sessions.

Land-based casinos have the bettors place their bets and pay for them on-site. It is thought that sports and event bettors will then play other games at the land-based casino. For some casinos, bets may also be placed at kiosks located throughout the casino so that the bettor need not go too far from where they may be playing other games. A few land-based casinos now take sports and event bets completely over the Internet where the bettor makes and pays for the bet on-line.

At a casino-based video gaming machine, the player typically gets three choices to end play of multiple games on a video gaming machine. The player can finish playing all the games paid for in advance. As another option, the player may cash out the remaining credit either in cash or on an account card for redemption at a kiosk or with a cashier. Further, the player may be permitted to cash out the remaining credit on an account card. The credit on the card may be used to play games at a later time.

There are many different types of games that are provided that involve the issuance of a lottery ticket to play a game of chance. Lottery tickets are sold through retailers using machines referred to as point of sale (POS) terminals. These tickets are generally printed at the POS terminal, and are usually issued for some lottery drawing to be performed at a later time. Examples of these types of lottery games of chance include traditional state lottery drawings and multi-state lottery drawings (e.g., PowerBall). Another type of lottery ticket, referred to in the art as instant lottery, includes a pre-printed scratch-type lottery ticket which includes a latex or similar coating that is scratched off by a purchaser (a player), revealing one or more game indicia and whether the player won the game or series of games as indicated on the ticket. The indication is generally "instant" in that the player knows, when they scratch off the ticket coating, whether or not they won the game.

There are many online games that can be played using a computer system coupled to a communication network (e.g., the Internet). These games may include traditional games of chance, games of skill, and casino-type games, among others.

Some systems combine lottery-type games and online games. In one such system, a lottery ticket is sold to a player, who then plays a further game using a computer system. In such a game system, the ticket sold to a player includes a code which is correlated to a game seed stored in a computer system upon which a computer game is played. The computer game determines the correlated game seed, and this game seed is mapped to a series of predetermined game states that lead to a predetermined outcome. That is, the code stored on the ticket includes the outcome. In another type of system, the code stored on the ticket is an encoded form of the lottery result, which is then revealed to the player at the end of play of an online game.

New and more interesting game formats are needed for lottery and casino type games that keep players' interest and therefore result in continued and/or return players. According to one embodiment of the present invention, it is appreciated there is a great deal of effort and expense to introduce additional games, especially in the casino area. In particular, as each game is introduced, its features are scrutinized by regulators prior to introduction. It therefore would be beneficial to be able to reduce the regulatory effort in introducing new games that are exciting to players to play. To this end, according to one aspect of the present invention, a system is provided having two games, one of which is already approved by regulators whose outcomes are used to drive outcomes of another game. Because the outcome determination and odds of winning the other game are driven by a previously-approved game, the regulatory hurdles associated with releasing the other game are reduced.

According to one aspect of the present invention, a method for playing games of chance is provided. The method comprises acts of permitting a player to pay for multiple games on a first video gaming machine, permitting a player to play zero or more games on the first video gaming machine, allowing a player to choose to not play remaining games already paid for on the first video gaming machine, and the first video gaming machine providing a ticket with credit to the player to play the remaining games. According to one embodiment of the invention, playing games of chance comprises an additional act of determining, by the first video gaming machine, the outcomes of the remaining games. According to another embodiment, the method comprises an act of storing, by the first video gaming machine, the determined outcomes for the remaining games.

According to one embodiment of the invention, the method further comprises an act of storing the determined outcomes on at least one of the provided ticket, a linked or networked central computer and a storage device within the first video gaming machine. According to another embodiment, the provided ticket includes a ticket identifier. According to another embodiment, the provided ticket further includes an access code. According to another embodiment, at least one of the ticket identifier and access code is printed on the provided ticket. According to another embodiment, at least one of the ticket identifier and access code is coded on the provided ticket magnetically.

According to one aspect of the present invention, the method further comprises acts of operating, by the player, a second video gaming machine, entering, by the player, at least one of the ticket identifier and access code from the provided ticket into the second video gaming machine, verifying, by the second video gaming machine, the at least one of entered ticket identifier and access code, accessing, by the second video gaming machine, the outcomes for the remaining games determined by the first video gaming machine, and providing, by the second video gaming machine, the remaining games to the player according to the outcomes determined by the first video gaming machine. According to one embodiment of the invention, the games of chance include one or more games from the group comprising bingo, keno, UK bingo, lotto, lottery games, baccarat and slot machines. According to another embodiment, the games of chance include a pre-determined outcome and wherein a player obtains the pre-determined outcome despite how the player plays the games.

According to one embodiment of the invention, the first video gaming machine is located in a casino. According to another embodiment, the first video gaming machine is a slot machine. According to another embodiment, the second video gaming machine is located in at least one of a casino, in a different casino, in a hotel, at a racetrack, at home, and in a mobile location. According to another embodiment, the second video gaming machine is one of a group comprising a slot machine, personal computer, PDA, and cellular telephone. According to another embodiment, the second video gaming machine is connected to the first video gaming machine or central server by one or more of the group comprising a local area network, a wide area network, and the Internet.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

In one embodiment of the invention, players may subscribe to play multiple game sessions, consecutive or otherwise. That is, the player pays at one time to play many game sessions. According to one embodiment, such players may subscribe to multiple games (e.g., fixed-odds or non-fixed odds games, games of skill, or games of chance) using a computer-based interface (e.g., a personal computer, cell phone, PDA, set-top box or other interface). In another embodiment, the player may also choose to have his or her subscription automatically renewed.

According to one embodiment of the invention, if a player paid to play the one or more games away from a video gaming machine, then the player may go to a video gaming machine and informs the machine of how many games the player wants to play or how much money credit that the player wants transferred to the video gaming machine. The information may be entered into a video gaming machine using any input device associated with the video gaming machine, including keyboard, touch screen, mouse, CD-ROM, ticket reader, or card reader.

Once the video gaming machine knows how many games or how much money credit that the player wants on the machine, the player may then play one or more games on the video gaming machine.

According to one aspect of the present invention, a player may also choose to not play remaining games on a video gaming machine. The video gaming machine may then determine the outcome(s) of the remaining game(s) according to another embodiment of the invention. After determining the outcome(s) of the remaining game(s), the video gaming machine then issues a ticket to the player. According to another embodiment of the invention, the player then takes the ticket and enters information from the ticket into another video gaming machine or personal computer.

Figure 7:
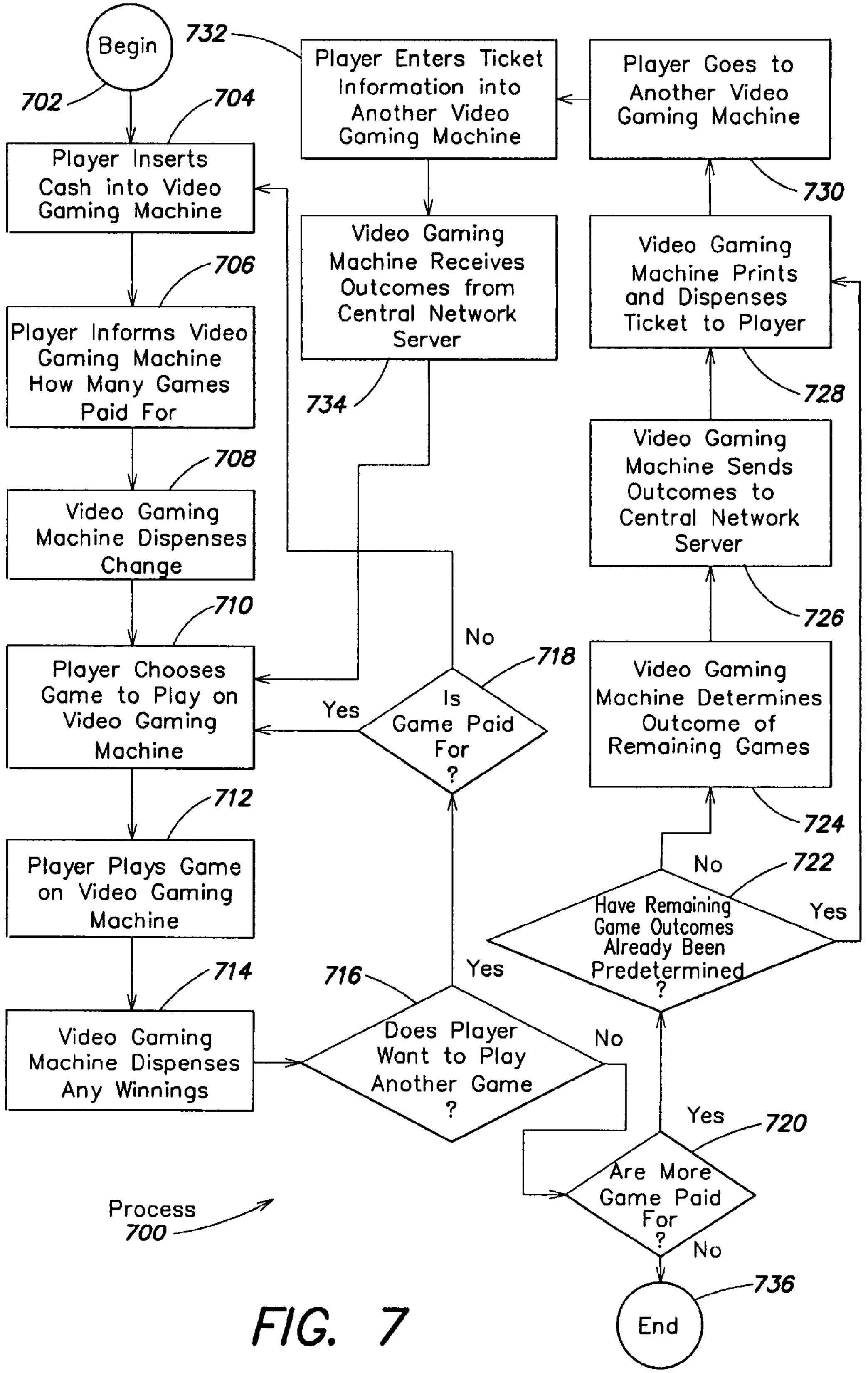
FIG. 7 is a flow chart of a process for conducting multiple game playing according to one embodiment of the present invention.

FIG. 7 is an example of a game play process according to one aspect of the present invention. The example process 700 begins with the player inserting cash into a video gaming machine at step 704. As stated above, the player may also use any other method for obtaining money credit on the video gaming machine, including, for example, credit card, debit card, and account credit. At 706, the player then informs the video gaming machine how many games the player wants to pay for. The player may use any input device, including, for example, a mouse, a keyboard, a touch screen, etc. to enter information into the video gaming machine. At step 708, the video gaming machine then determines the amount of change to dispense to the player based upon the money credit the player placed on the video gaming machine in step 704 and the number of games the player entered in step 706. Instead of cash, the extra money credit may be remitted to the player by any number of other methods including account credit or ticket credit redeemable at a cashier.

At step 710, a player chooses the game to play on the video gaming machine if more than one game is possible. According to one embodiment of the invention, the game is a game of chance. According to another embodiment of the present invention, the outcome of the game may be predetermined. After selecting a game to play, the player then plays the game on the video gaming machine and achieves an outcome. Depending upon the outcome, the video gaming machine then provides the winnings to the player at step 714. The winnings may be provided by any method including providing the player cash, account credit, and/or ticket credit redeemable at a cashier.

At step 716, the player determines if he or she wants to play another game. If the player does wish to play another game, then the video game machine determines if the player has another game credit from step 706 available. If the player does have another game credit, then the player is asked what game the player wants to play and continues process 700 at step 710. If the player does not have another game credit, then the player returns to step 702.

If the player does not want to play any more games at step 716, the video gaming machine determines if the player has any more game credits at step 720. If the player does not, then the process 700 ends at step 736. If the player does have more game credits available at step 720, then the video gaming machine determines if the remaining games on credit already have a predetermined outcome at step 722. The remaining games may have predetermined outcomes for several reasons, including that the game credits came from another video gaming machine using process 700.

If the remaining games on credit do not have a predetermined outcome, then the video gaming machine determines an outcome for each remaining game on credit at step 724. Alternatively, the outcome of the remaining games on credit may be determined by a central computer or another video gaming machine connected by network to the first video gaming machine. At step 726, the video gaming machine then sends the determined outcomes to the central computer for storage in memory. Alternatively, the determined outcomes may be stored by any known method. For instance, the determined outcomes may be stored in a location that is accessible by network, including the Internet.

Once the determined outcomes are stored in step 726 or if the remaining games on credit already have a determined outcome at step 722, the video gaming machine then issues a ticket to the player at step 728. At a minimum, the ticket includes a ticket identifier and optionally an access code. As an alternative to a ticket, the video gaming machine may issue an account card, CD-ROM, or any other item that has information readable by the player or reader or input device on a video gaming machine or personal computer.

Once receiving the ticket in step 728, the player may then go to another video gaming machine, personal computer, or other system at step 730 at any time and then enter the ticket identifier and other required information into the another video gaming machine or system. At step 734, the another video gaming machine then retrieves the determined game outcomes from the central network computer or storage device that the determined outcomes are stored on. Alternatively, the determined outcomes are encoded on the ticket or the medium provided to the player by the first video gaming machine.

Process 700 is merely an example of one embodiment of the invention, and it should be appreciated that variations of process 700 are within the scope and spirit of the invention. For instance, steps in process 700 may be reversed, moved, or performed in parallel. In one example, steps 704 and 706 may be reversed, i.e. the player tells the video gaming machine how many game credits are desired and then provides the proper money credit or cash to pay for the desired game credits. Steps may also be eliminated such as step 710, if the video gaming machine is programmed for only one game, or step 708, if no change is due the player.

Figure 2:
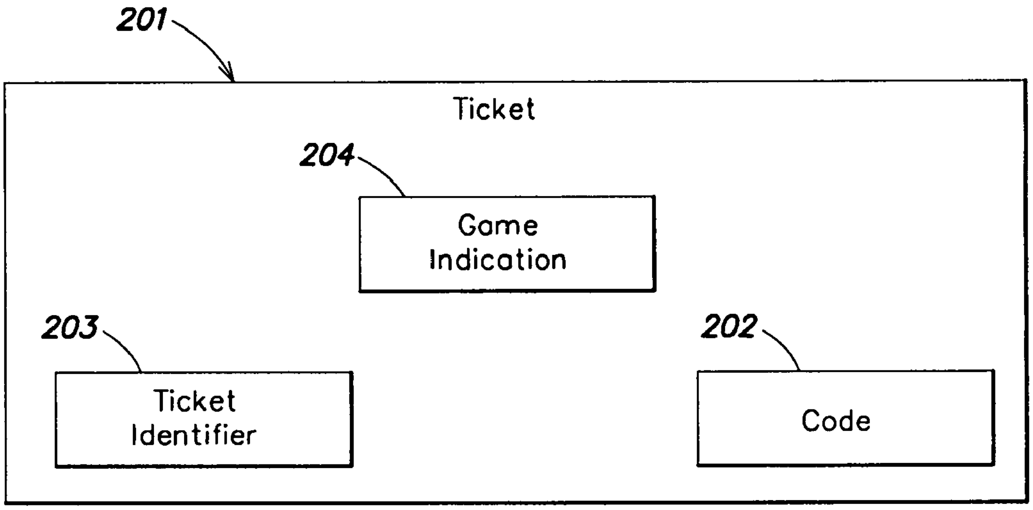
FIG. 2 is an example ticket that may be issued in association with a game according to one embodiment of the present invention.

FIG. 2 shows an example ticket 201 that may be issued to a player. The player may scratch a surface of the ticket (in the case of a scratch ticket) to reveal one or more indications. These indications may include, for example, a serial number of the ticket, an access code, or other indication (or combination thereof) that may be used to access the online game. Alternatively, the ticket may be a pull-tab ticket or other ticket type suitable for presenting indications to a player.

The ticket may include other indications (e.g., a decryption key or portion thereof as described above that may be used to decrypt game results). Also, the ticket may indicate to a player the number of plays of a second game (e.g., as played by the player on a computer system). For instance, in the case of a slot machine game, the ticket may indicate the number of spins that a player may be awarded by the ticket. In the case of a COLLAPSE-type game, the ticket may indicate the number of game instances (or plays) of the COLLAPSE-type game that can be played by the player. Further, as discussed above, the player may be permitted to play any one of a number of offered games, and the player may select different games to play to reveal results associated with game instances.

In one embodiment, ticket 201 includes a code 202 printed on a surface of the ticket that provides access to outcomes (e.g., prizes) stored on the server. As discussed, code 202 may also include, as an optional feature to increase security, a key that may be used to decrypt the outcome. This outcome may be stored in a database stored on a server system. Ticket 201 may also include a ticket identifier 203 used to identify the ticket, and which may be used to identify the outcome associated with the ticket. Further, ticket 201 may include a game indication 204 that relates information relevant to a game played on a computer system. For example, there may also be stored, on the ticket, an identifier that indicates, to the player, the number of plays associated with an online game. In one example, a player purchases a ticket at a retailer or other POS location.

Figure 1:
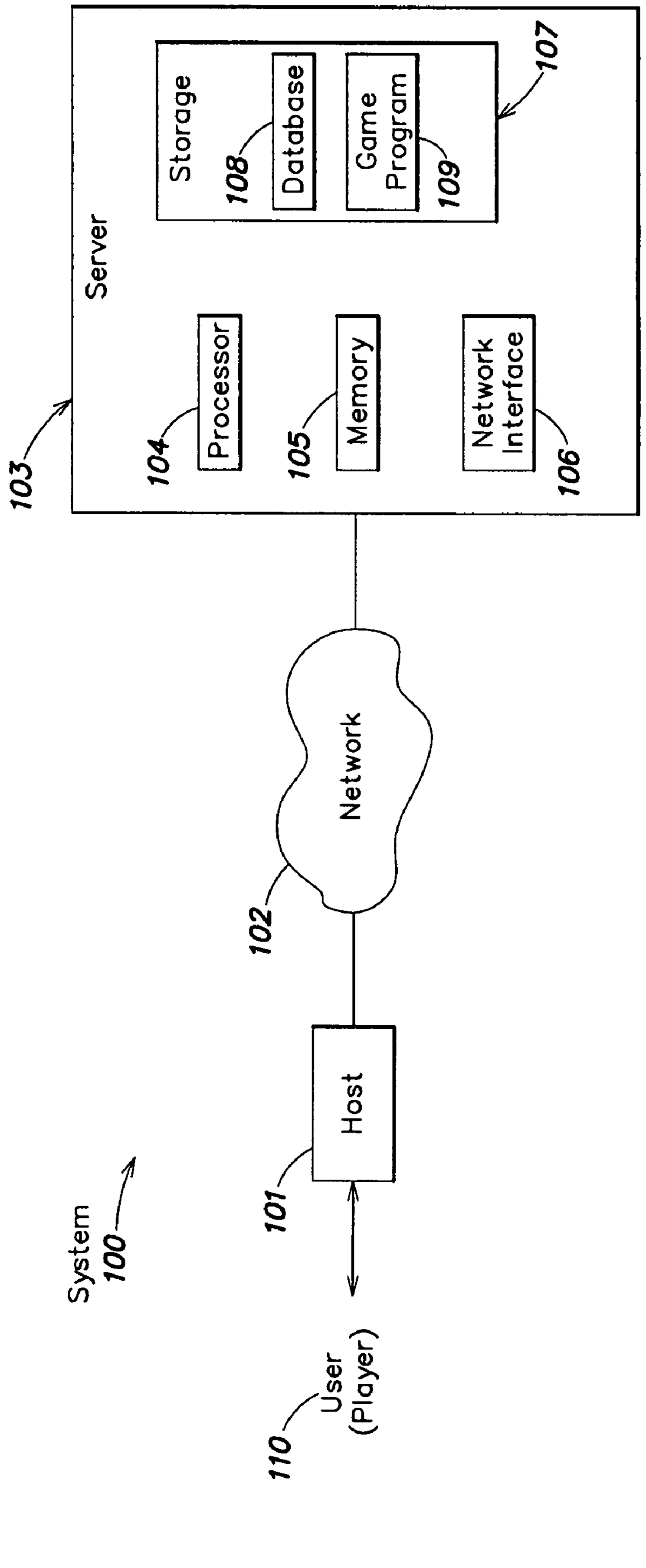
FIG. 1 is a block diagram of a system for conducting a game according to one embodiment of the present invention.

The player then proceeds to play a game on a computer system. FIG. 1 shows an example system 100 according to one embodiment of the invention upon which a game may be played. The user (a player) 110 plays a game through an interface of a host computer system (e.g. host 101). Host 101 may be any type of computer system that is capable of playing a game. The host may be, for example, a general-purpose computer system (e.g., a personal computer (PC)) that connects to a network (e.g., the Internet). Other general purpose computer system types (e.g., a PDA, a cell phone, set-top box, or other system type) may be used to play the game.

The computer system may be coupled to a server system 103 through one or more communication networks 102. The server may provide a game program 109 that is executed by host 101 for playing the game. More particularly, game program 109, when executed, may provide an online game that can be played by a user through an interface associated with host 101. This online game may be, for example, a video slot machine, blackjack, or other online or casino-type game.

The game program may be stored, for example, in a computer-readable medium (e.g., a memory, storage, or other media) associated with server 103 that provides game programs. For instance, the game program may be stored on a web server and downloaded to a client computer over the Internet. Game program 109 may be one of a number of game programs associated with an online game experience. Different game programs may be selectively downloaded to the client, based on the type of game ticket issued, the game selected for play by the user, the type of client used, or other criteria.

Server 103 may also be a general-purpose computer system, or any other type of computer system capable of authenticating tickets, providing game programs, and performing other game-related functions. Further, it should be appreciated that various game functions may be performed by one or more server systems. Server 103 generally includes a processor 104 for executing server-based game functions. Server 103 may also include a memory 105 for storing data associated with game programs. Server 103 may also include one or more network interfaces 106 that couple server 103 to network 102, which permit server 103 to communicate with one or more hosts. Further, server 103 may include one or more storage entities 107, including disks or other media for storing data. In one embodiment, storage 107 is adapted to store one or more game programs 109 as discussed above. Server 103 may have any number or type of processor that executes an operating system and one or more application programs. In one embodiment, server 103 provides web server content to one or more clients for the purpose of accessing and playing the game.

Server 103 may also include a database 108 that is adapted to store one or more outcomes associated with a ticket or other gaming piece. As discussed, the outcome may be indexed using an identifier of the ticket.

Figure 3:
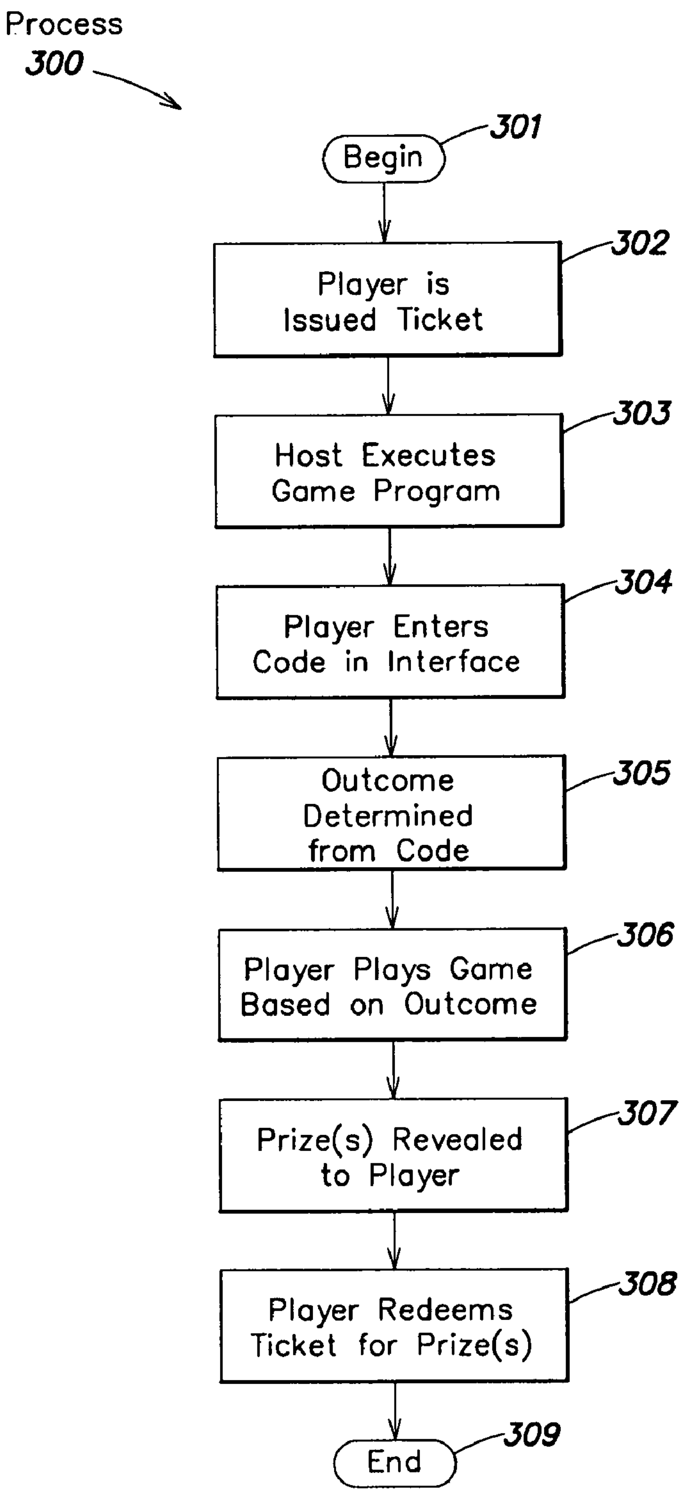
FIG. 3 is a flow chart of a process for conducting a game according to one embodiment of the present invention.

FIG. 3 shows one example process for conducting a game according to one embodiment of the present invention. At block 301, process 300 begins. At block 302, a player is issued a ticket. As discussed, a player may purchase a ticket at a retailer or other POS location. At some later time and/or location, the player may play an online game on one or more computer systems (e.g., a PC or other computer system capable of playing games). For instance, at block 303, a host computer system (e.g., host 101) executes a game program. The game program may be, for example, an online game that includes one or more components downloaded over a communication network (e.g., the Internet).

As discussed, the ticket may include a code which is used to access the outcome of a game. This code may be printed on a face of the ticket as discussed above with reference to FIG. 2. In one example system, the player accesses a website that includes an interface in which the player may enter the code at block 304.

This interface may be, for example, used to access the game, or may be any other interface (e.g., an interface used to access a download website used for downloading game software (e.g., game program 109)). The interface may be programmed in one or more computer languages (e.g., an HTML, Java, Macromedia Flash, or other type interface) and may include a text entry box in which the player can input the code. The interface may include other ways of entering a code or other parameter (e.g., a glyph printed on a ticket) that allows the user to gain access to the game. It should be appreciated that the invention is not limited to any particular method for entering the code, or any format of the code, and that any type of code or method of entry may be used.

The player enters the code, and an outcome is determined at block 305 based on the code. More particularly, there may be a mapping between the code printed on the ticket and an outcome stored on the server. This code may be stored, for example, in a database structure stored in database 108 of the server. Database 108 may be, for example, a relational database, object database, flat file database, or other organizational entities used to store and maintain data. Further a listing of winning codes may be furnished to an organization that provides the game (such as, for example, a state-run lottery commission). The code may, as discussed above, include an optional decryption key that decrypts an entry stored on the server. This entry may indicate one or more outcomes of game instances.

The outcome of the game is then used by the online game to determine play of the game by the player at block 306. For instance, if the stored outcome is "Win $50," the online game may present an outcome to the player that indicates that the player won a $50 prize. This presentation may be in the form of one or more reveals presented to the player while playing the online game at block 307. The presentation may be progressive, in that the ultimate outcome (e.g., "Win $50") is achieved through a set of reveals or progressions through the online game. For example, in the case where a COLLAPSE-type game is played wherein items are collected for playing in a second level game, such reveal outcomes of each instance of the COLLAPSE-type game may be stored on the server.

As discussed, prizes may be distributed over game instances and/or items (or more generally, win opportunities) to maximize game interest and to entice the player to play each game instance associated with a particular ticket. For example, one approach may include providing to the player an early (relative in the series of game instances) indication of winning to keep the player interested. As the player plays more game instances, the magnitude of the prizes may be adjusted such that a level of game "drama" is increased. That is, prize values are adjusted among later game instances to provide relatively higher prize values in later games. Other approaches/distributions may be provided for increasing or maintaining game interest.

Once played, the player may redeem the ticket at the point of sale or other redemption location at block 308. Alternatively, the player may be permitted to redeem the ticket without playing the game. Redemption may be permitted, for example, after a predetermined time. For instance, the player may be permitted to redeem a ticket after a set time (e.g., 10 PM), a particular time period after ticket purchase (e.g., 24 hours) or other absolute or relative time. This may be the case for a Keno or lottery-based system, where a Keno or lottery result is made available at a set time after ticket purchase. Alternatively, tickets may be redeemed immediately after purchase. At block 309, process 300 ends.

Payouts may be determined by a pay table associated with the game. The number of tickets may be determined a priori, and a pay table that determines payouts may be allocated to the tickets. This allocation may be determined, for example, by shuffling the pay table and allocating results to tickets. The following is an example of a pay table that may be used with a game according to one embodiment of the invention:

Number of Tickets Issued: 2000

Ticket Price: $5

TABLE I

Example Payout Table

| Number of Tickets | Payout |
|---|---|
| 1 | $100 |
| 700 | $ 10 |
| 500 | $ 5 |
| 100 | $ 1 |
| 600 | $ 0 |

Game Operator Return: $300 (3%)—expenses

As shown in the example above, a certain number of tickets may be allocated as winning tickets having a particular payout (e.g., an outcome). Some tickets may have no payout associated with them, and some may only have a nominal payout (e.g., a small award amount, free ticket, etc.). A small number of tickets may include a large payout as compared to the magnitude of other payouts. It should be appreciated, however, that payouts are not limited to money, but other types of prizes may be awarded including merchandise, credit, loyalty points or any other representation of value.

The odds of winning may be the type of odds experienced in actual (rather than computer-based) games. Alternatively, the odds of winning may not necessarily be "natural" odds of winning any particular type of game, but rather, the odds may be adjusted to obtain the outcome desired (e.g., by the gaming operator). The odds of winning, number of winning tickets, amount of payout per ticket, or other payout parameter may be any amount or number, and the invention is not limited to any particular odds of winning, number of winning tickets, payout amount or type of payout. However, according to one embodiment, the overall odds of winning, amount and type of payout, etc. may be similar to a game previously approved by regulators (e.g., scratch ticket games, Keno, bingo, etc.) so that the use of an additional game to display an outcome associated with the previously-approved game is scrutinized much less by regulators, and as a result, the approval of the additional game is less burdensome. To this end, a system associated with the previously-approved game may provide ticket and outcome information to a system conducting an online game (e.g. server 103).

The code stored on the server (e.g., server 103) may be used to determine game play as played on the computer system. For instance, the game outcome may be "Win $50." In the case of a slot machine-type game, the ticket may indicate that the player receives 10 spins of the slot machine. The outcome of each spin may be predetermined, and the game may retrieve information from the server indicating a predetermined sequence of game play as discussed above. In the case of a slot machine-type game, the predetermined sequence may indicate the winnings associated with each of the spins. In the case of a COLLAPSE-type game, the outcome of each instance of the second level game may be stored on the server and retrieved prior to game play.

In another example, only the overall outcome is predetermined (e.g., the total winning associated with the ticket), and the sequence of game play may be determined when the game is played. In the example above where the player is indicated as winning $50 over 10 spins, the $50 winnings (and any intermediate losses) may be allocated to the player at any point over the 10 spins. In the case of the COLLAPSE-type game, winnings may be allocated across game instances. In a further example, winnings may be allocated across items collected while playing the COLLAPSE-type game. Because the number of items collected may vary depending on the skill of the player, the distribution of prizes among collected items may be determined during game play by the game playing system. Thus, according to one embodiment, the player's skill (or lack thereof) does not affect the overall outcome of the game.

This allocation may be determined by the server, the game software executing on the client, or a combination thereof. Further, the game play may be randomized in that a further play using the same ticket may yield a different sequence of game states leading to the same outcome. For example, in the case of a slot machine game as described above, a player may be indicated as winning $50, but the sequence by which the player attains the $50 winning outcome may be different depending on various factors. Such factors may include a randomization function that determines results of individual game plays (e.g., in the case of a series of "spins," the result of each spin), or some other function. The series of intermediate outcomes may be stored in a database associated with the server as discussed above with respect to game outcomes. Also, the outcomes may be adjusted using a formula or rule-based approach during execution of the game to increase the game drama and heighten the game playing experience.

According to another aspect of the present invention, a player may purchase a ticket at a point of purchase (e.g., a convenience store) and the indication of a win/no win condition of the ticket is revealed on a different medium. For instance, a player purchases a scratch ticket in a convenience or other type of store. The prize that the player wins is not revealed on the scratch card itself, but rather the prize is revealed through another medium (e.g., on a home computer system, PDA, cell phone, etc.).

For instance, as discussed above, the player may be presented another game (e.g., a slot machine or COLLAPSE-type game as described above) that reveals at least a portion of the prize. The underlying prizes available via the reveals may be predetermined, in that the outcome of the game may be stored in one or more systems. The scratch ticket may reveal different numbers of plays (e.g., pulls in the case of a slot-machine type game, or game instances of a COLLAPSE-type game) the player receives.

In one aspect of the present invention, the ticket includes authentication information that is used to obtain the reveals. In one example, the scratch ticket contains a secret key which is used to decrypt the results that are revealed to the player. That is, according to one aspect, it is impossible to determine if and what a particular ticket wins without having possession of the ticket (and therefore the secret key). In another example, the scratch ticket could contain only a portion of the secret key. The other portion of the key may be stored, for example, on a server and retrieved from a database (e.g., file, relational database, etc.) based on, for example, the serial number of the card. Mappings of serial numbers of tickets to encrypted results can be provided to the lottery provider for additional audit control.

Figure 4:
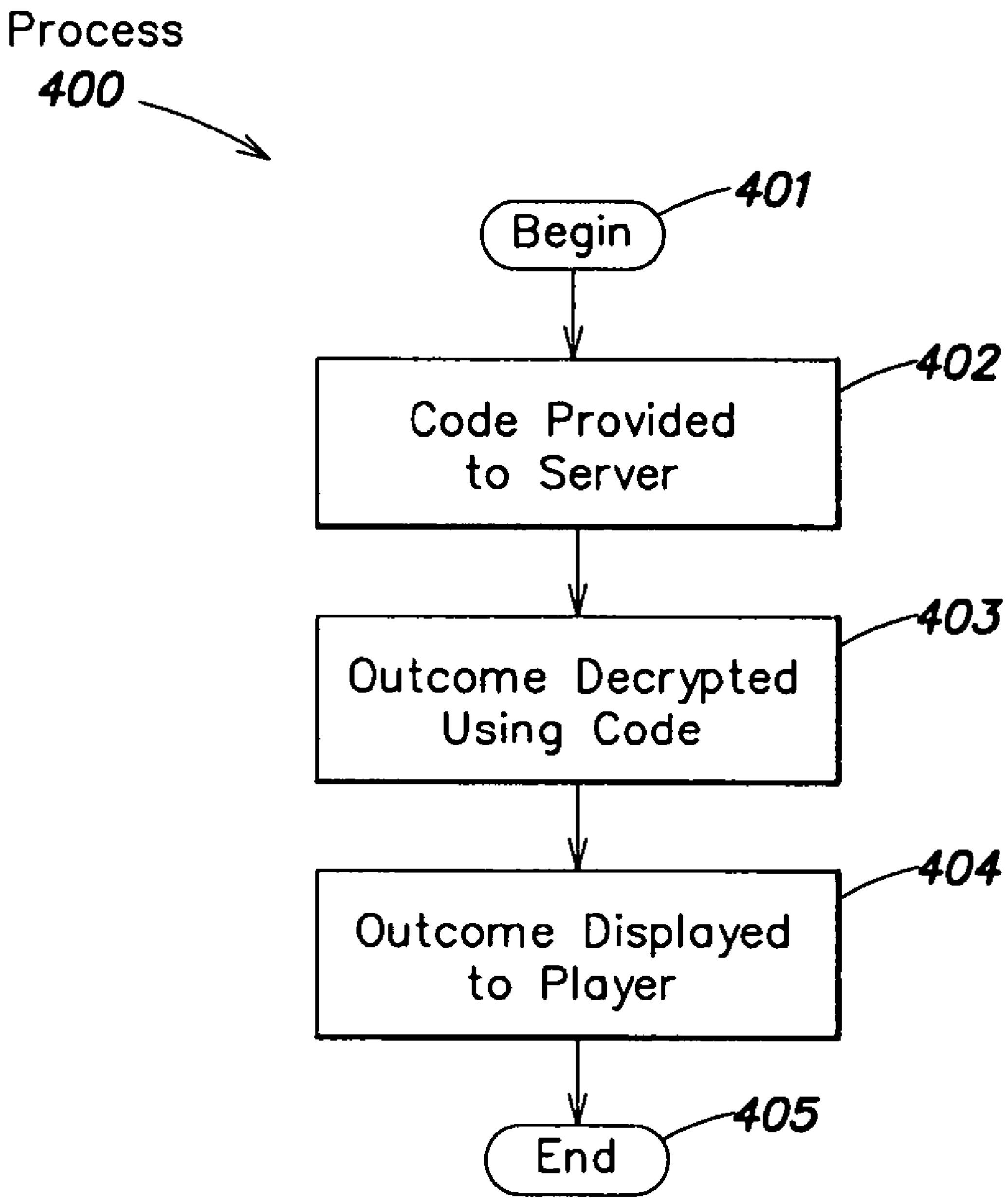
FIG. 4 is a flow chart of a process for conducting a game according to another embodiment of the present invention.

A process for performing secure access to outcomes is shown in FIG. 4. At block 401, process 400 begins. A server (e.g., server 103) may store a number of outcomes in encrypted form, each of which outcomes can be accessed by a respective code. These outcomes may be encrypted, for example, using any encryption method (e.g., symmetric, asymmetric encryption) as is known in the art. At block 402, a code is provided to the server (e.g., server 103).

This code may be, for example, a secret code (e.g., a symmetric key, a private key) printed on a ticket and provided to the server by a user through an interface of a computer system as discussed above. The received code may be transmitted between systems using a secure transmission method (e.g., SSL) as is known in the art. The received code is used at block 403 to decrypt the outcome stored on the server. This code may be any decryption key type that may be used to decode data, and may be of any format or length. The decrypted outcome may then be presented to a player at block 405. The outcome may be displayed using any method. For example, as discussed above, the outcome may be presented through one or more reveals presented to the player during play of an online game. At block 405, process 400 ends.

Another aspect of the present invention relates to a lottery-based software game that can be played over a network, such as the Internet. According to one embodiment, the system includes a purchase of a scratch-based or printed ticket by a player at a point of service (POS). A POS may be, for example, a place at which lottery tickets may be sold, including convenience stores or other locations where lottery products are provided. In an alternative system provided at a casino or other gaming establishment, a ticket may be sold to a player at the casino for play at a later time.

The player receives the ticket at the POS or other location, and proceeds to play a computer-based game at another location to reveal a result (or outcome) of the game. The computer-based game may be, for example, a casino-type game (e.g. slot machine, video poker) or other type of game, including amusement games or games of chance. In the case of the scratch or printed ticket, the result is not apparent to the player until the player plays the computer-based game. This game may be, for example, a software program that is downloaded and played over the Internet. Alternatively, other ways of accessing the online portion of the game may be used (e.g., PDA, cell phone or other method).

The ticket includes a code by which a player gains access to a result stored on a server that stores ticket information and results associated with each ticket. Such information may be predetermined at the time of ticket sale, or the results may not be known until a later time, after the ticket is issued to the player (e.g., in the case of a Keno, bingo, or other drawing-based system). According to one embodiment, the code is an access key (or a portion thereof) that is used to access the result stored on the server. Further, the result (stored in the server) may be encrypted. For example, the code may be a private key or a symmetric key. The key may be transmitted by a client computer system to the server for the purpose of decrypting the result using SSL or any other secure method.

Because the decryption key is stored on the ticket, the gaming system is safer, as a breach of security of either the tickets or the server does not provide access to result information. More particularly, access to the lottery ticket database may not be accomplished without the ticket (used to decrypt the result). Further, the tickets may not be correlated to results without the lottery ticket database (because the results are stored in the database, not on the tickets).

In another example of the system, a portion of the key used to decrypt results of the game is stored on the ticket, and another portion is stored in the database of the server. In this manner, it is assured that possession of either portion of the key may not compromise the results.

However, it should be appreciated that the system does not require SSL or any other encryption/decryption method, a decryption key on the ticket, or the stored result on the server to be encrypted. Rather, the game can be implemented with or without these features. That is, access to the outcome stored at the server may be performed using only the serial number or other ticket identifier printed on the ticket.

The scratch-based or printed ticket also includes a second serial number or other identifier (e.g., an access code) in addition to the serial number or other identifier which is correlated to results on the server. A ticket may include both a serial number and a ticket identifier used by the system. According to one embodiment, it is appreciated that there may be security issues with using the serial number of a printed ticket (as printed on the ticket) to correlate to win outcomes. That is, the lottery provider may not allow any entity outside of the lottery system to have the ability to correlate outcomes to serial numbers. To this end, another identifier (e.g., a separate ticket identifier or access code) may be provided on a ticket to allow the system to index into an outcome database.

In one example system that works in association with a lottery system, outcomes for a game may be predetermined to comply with lottery rules. In this case, outcomes are predetermined and stored in a database. In an alternative environment where results are not permitted to be predetermined (e.g., in a casino), but rather are determined at a later time (e.g., by a drawing or other method), a ticket issued by a system in such an environment may have an associated drawing time when a game may be played. In the case where the online game system is driven by a Keno game result, each ticket may be associated with a set of numbers in the Keno game, and the result of the Keno game is provided as the result for the online game. In one example, a computer system automatically picks numbers associated with the ticket at the point when the ticket is issued. Thereafter, when the Keno game occurs, the result of the Keno draw is provided to an online game system, which translates the Keno result to a game experience within another game (e.g., COLLAPSE, slot machine, etc.). It should be appreciated, however, that although the game of Keno may be used to drive an online game experience, other games (e.g., bingo) may be used.

The server (e.g., server 103) may be capable of accepting, from the user, an input of the serial number and decryption key, and in response, providing the results associated with the particular ticket. The result or outcome of the game may be displayed to the player in an interface of the computer system (e.g., a client computer system such as a personal computer (PC)) used to play the computer-based game. For example, the outcome of a series of plays associated with the ticket may be stored in the server, and provided to the client, and the series of outcomes may be presented to the player during play of the computer-based game.

In another embodiment of the system, a payout of the ticket may be encoded on the ticket. For instance, if the ticket is a $5 winner, the amount of the win may be encoded on the ticket. In the case of the casino-based version of the system, the payout may not be stored on the ticket (as the payout is not predetermined), but rather the purchase price of the ticket may be stored on the ticket, or some other identifier of the ticket.

Figure 5:
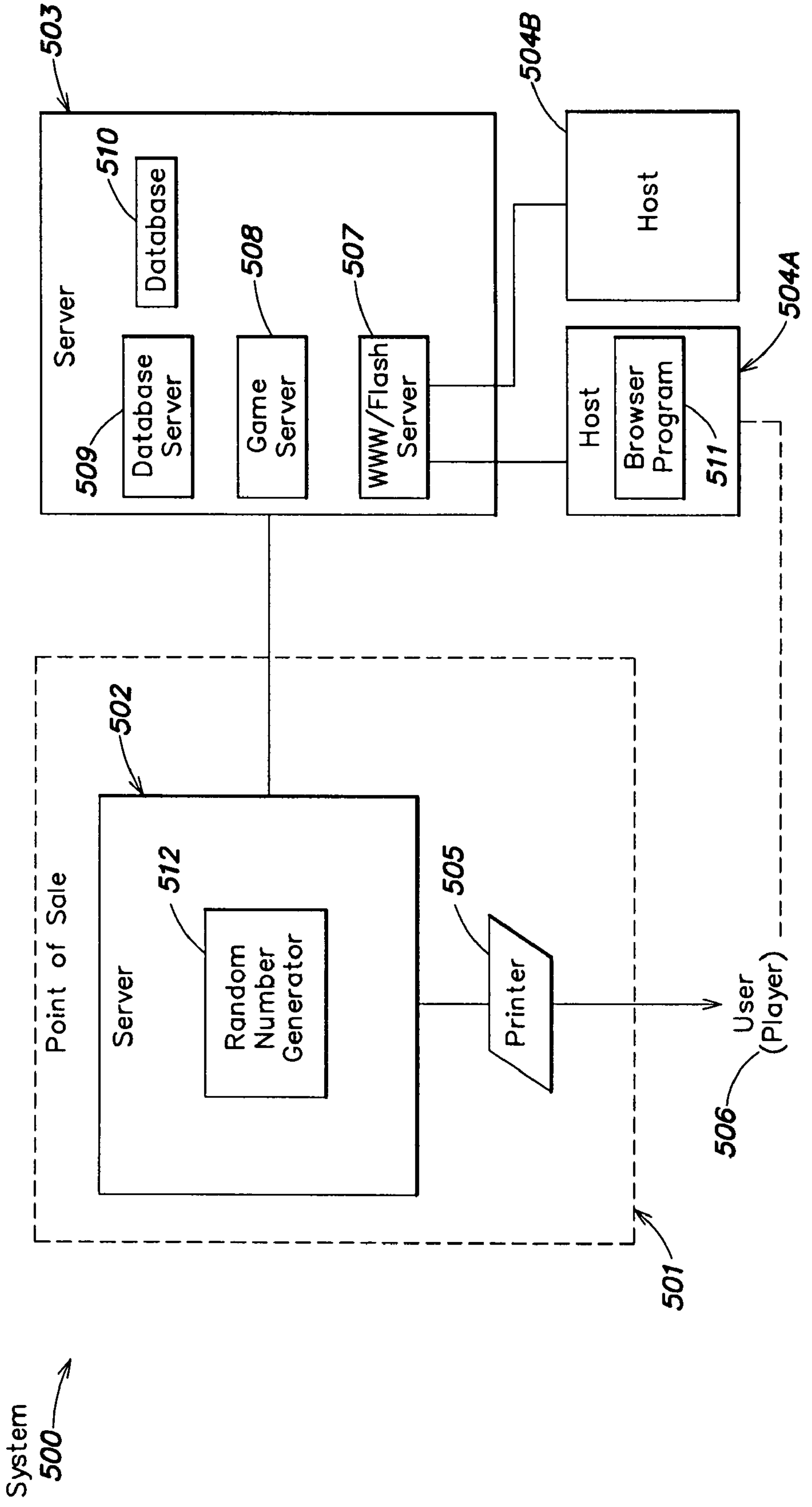
FIG. 5 is a system for conducting a game according to according to one embodiment of the present invention.

As shown in FIG. 5, a system 500 may be provided having more than one server. For instance, a server 502 provided at the point of sale 501 is primarily responsible with issuing tickets to a user/player 506. To this end, server 502 may issue preprinted tickets or may issue tickets printed from an associated printer 505. Such tickets may include one or more identifiers as discussed above with reference to FIG. 2. As discussed, another system such as a Keno or lottery-based system may be used to provide results to an online game system.

In one version of system 500, the win/loss determination of a ticket may be driven by a later-occurring drawing. For example, a Keno-based, bingo-based, or other type lottery draw system may be used wherein the outcome of a particular game is not known until a future time (e.g., when a drawing occurs). In this case, the ticket identifier stored on the ticket may be an access code generated from ticket identifiers in the Keno-based system (e.g., by an intermediate system or the Keno server itself that can translate a Keno ticket identifier into another type of identifier).

Generation of an identifier separate from the Keno ticket identifier may be necessary for security reasons relating to the Keno system. More particularly, access to the Keno ticket identifiers may not be permitted by the system (e.g., the Keno server). In one example, a Keno system translates Keno ticket identifiers into access codes and results that are stored on the game server (e.g., server 503). Thereafter, clients (e.g., hosts 504A, 504B) access results stored on the server based on their respective access codes.

As discussed above, one or more hosts 504A, 504B (e.g., general purpose computer systems) may communicate with a server 503 over a network for the purpose of conducting a game. In one example, a host 504A renders a browser window by executing a browser program (e.g., the Internet Explorer browser program available from the Microsoft Corporation). A user/player 506 enters a URL address specified by an issued ticket in a window of the browser interface, and is directed to a website associated with server 503. This website may be rendered by, for example, a WWW server process (e.g., server 507) associated with server 503.

Player 506 may be instructed to enter an access code (and/or any other required information) to access one or more games in an interface presented through the browser. As discussed, server 503 may validate the received access code, and provide any results stored in a database associated with server 510. Once validated by server 503, the user may be permitted to play one or more games. These game may be, for example, be programmed using one or more programming languages (e.g., Macromedia Flash) and may be downloaded to host 504A and executed.

Also, outcomes associated with any games may be downloaded prior to game play. As discussed, examples of games include those that may be of the lottery-type (e.g., having a predetermined outcome) and those that are casino-based (e.g., having an outcome that is not determined at the time of sale of the ticket). In the case where a later drawing affects an outcome, a player may not be permitted to play the game until the drawing occurs (and until results are available at server 503). In the case of a drawing that affects outcomes, drawing results can be communicated from server 502 to server 503. In addition, server 502 may maintain a mapping from a ticket identifier (e.g., a serial number) to an access code provided on the ticket, and provide a mapping of outcome to access code when the drawing occurs. As discussed, such outcome information may be maintained in a database 510 associated with server 503 and may be accessed through a database server process 509.

As discussed, the payout of the lottery ticket may be displayed to a player in a number of ways. For instance, the payout of the ticket may be presented to the player through one or more reveals presented to a player during one or more plays of an online game.

For instance, in the case of a slot machine game, a player may be permitted, with the issue of a single scratch or printed ticket, a series of spins of the slot machine. The slot machine may, as the result of each of the spins, produce results that contribute to the overall payout to the player. For instance, after a single spin, a player may be presented an indication that he/she has won $5. The payout to the player as provided from the server database may be, for the series of spins, $50 overall, with particular outcomes for each spin. Additional spin results may provide the additional $45 that the player will receive. Additional spins may add, subtract, or have no affect on the contribution to the outcome of the game. These results of each spin of the slot machine game may be stored in the database of the server indexed by the ticket identifier, or may be randomly determined by the game program that renders the game. Further, as discussed above, the results of each spin may be "scripted" such that the game experience is more exciting to the player.

For example, in the case where the results of each spin are stored on the server, the series of results may be downloaded to the client at the beginning of the game as a series of entries, and the client may reveal each result as the player progresses through the series of spins. In the random method, results for each individual spin are not predetermined, but rather are determined by the client in a random manner. For instance, the actual outcomes of each spin may be randomly chosen among the possible combination of outcomes that may produce the required payout. In either case, the outcomes for each spin of the slot machine game is not stored on the ticket, but rather is stored at the server and downloaded just prior or during game play, or is determined randomly by the client. Alternatively, the client may determine the game experience based on a predetermined set of rules or formulas that, when an overall outcome is provided, allows the client to determine intermediate outcomes in a dynamic way.

Because the game play and outcome are scripted, a player may also not play the game (and possible secondary games) to actually win. A player may purchase a ticket, wait until the ticket may be redeemed, and go to a POS to find out (and if necessary, receive) his/her winnings. A ticket may be allowed to be redeemed after a predetermined period of time after the drawing independent of whether the player has played the game. A ticket may be able to be redeemed after a predetermined period of time, from almost immediately to seconds to days or any predetermined time. For tickets with results dependent upon results of a particular Keno game or other event, the ticket may not be redeemed until after the event has passed.

Finally, after play of the online game, the player is permitted to validate the ticket at any POS location (e.g., 501 (for example, a lottery agent, casino, or other gaming establishment) to redeem his/her winnings as indicated during the online portion of the game. According to one embodiment, players are permitted to redeem their winnings only after playing the online portion of the game. The player, by playing the online portion of the game, sets status information at the server (e.g., server 503). When the player attempts to redeem the ticket at the POS (e.g., 501), the status information may be checked, and the player is permitted to redeem his/her winnings. To this end, server 503 may communicate information back to server 502 relating to game play.

For instance, server 503 may collect information that indicates the sequence of game play performed at the client, and other player tracking information. In one example, tickets may be associated with a particular player, and the player may be awarded loyalty points or other credit for playing the game.

Taking a COLLAPSE-type game, a player is issued a ticket at a POS to play one or more instances of the COLLAPSE-type game. The ticket indicates an access code, and the player uses this access code to gain access to the system (e.g., from a host coupled to server 503 through the Internet). The player enters the access code in a user interface, and, once validated, is permitted to play the COLLAPSE-type game. As discussed, the COLLAPSE-type game is a version of the well-known game of COLLAPSE, which is a game of skill-based puzzle game. Optionally, the player is permitted to play, based on a single access code (and ticket), any one of a number of games available from server 503. Such an option may allow a player to play different games for each game instance associated with the ticket.

Figure 6:
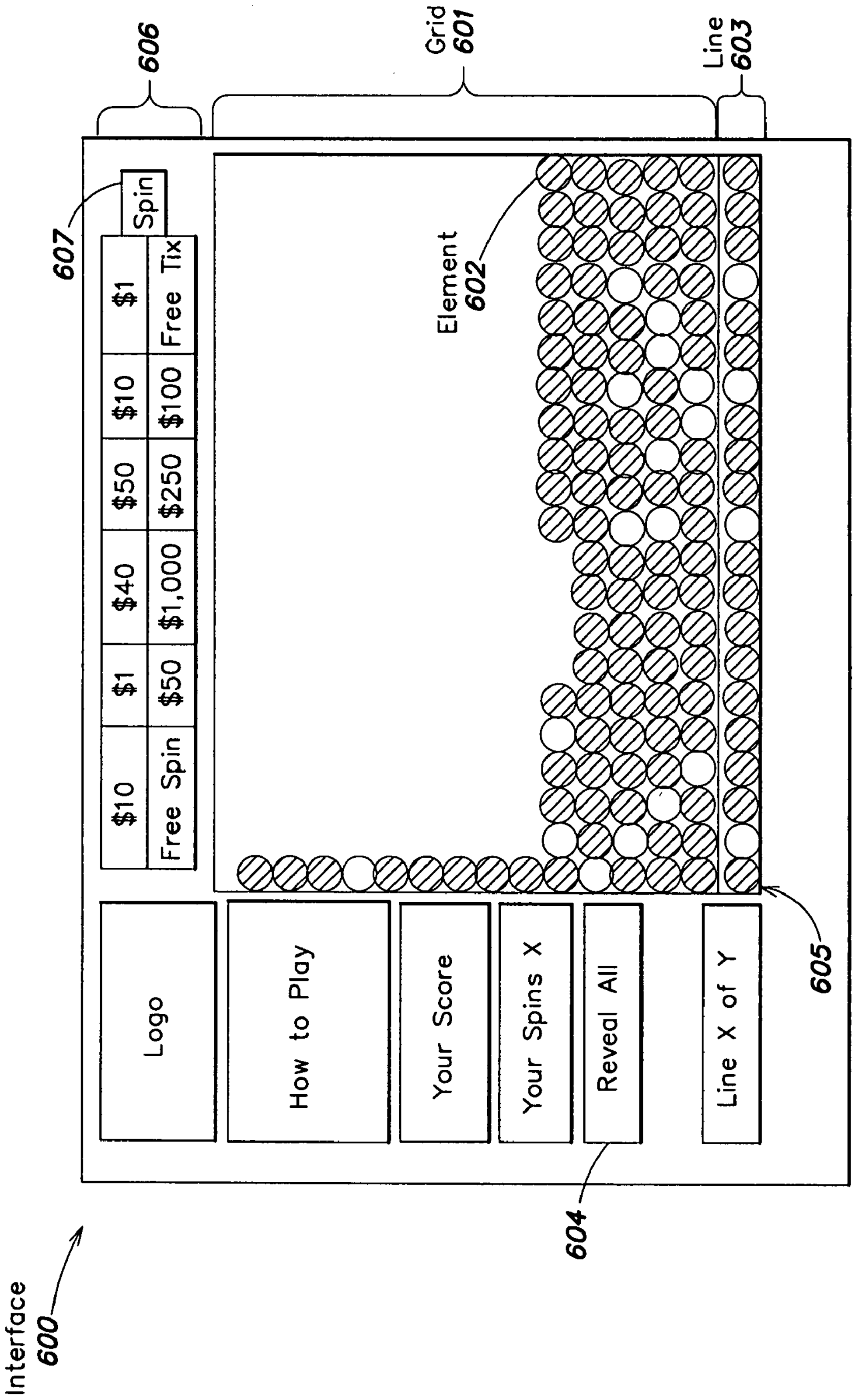
FIG. 6 is a game interface according to one embodiment of the present invention.

FIG. 6 shows an example game interface 600 according to one embodiment of the present invention. The COLLAPSE-type game involves an interface 600 that has a grid 601 of elements (e.g., element 602). Similar elements within grid 601 may be identified by color, shape, or any other indication. One or more new lines of elements (e.g., line 603) are fed into the bottom of the grid periodically.

A player removes groups of similar elements by selecting them within the grid, and the player is awarded points based on the number of elements removed. For example, similar elements may be indicated by color, and groups of similarly-colored elements may be removed from the grid. In one example, groups of three elements can be removed. Removal of larger groups of similarly-indicated elements may provide more points than smaller groups. It should be appreciated, however, that elements may have one or more indications that represent that they are similar, and the invention is not limited to any particular indication(s). Further, it should be appreciated that any number of elements may be removed as part of a group, and the invention is not restricted to any minimum number of element that may be removed.

Lines are moved into a preview area 605 associated with interface 600 that permits the player to anticipate what element types are being placed into grid 601. Lines of elements may be moved into the grid at a predetermined rate, and the rate may be adjusted from time to time during game play. In one example, elements may be fed into the preview area from left to right, and when a line of elements is complete, the line of elements is pushed into grid 601. The COLLAPSE-type game ends when the grid overflows with elements or a final line (e.g., of a predetermined number of lines) is fed into grid 601. As an additional option, a player may bypass play of the COLLAPSE-type game by selecting a "Reveal All" element 604 within interface 600. Selection of element 604 may cause the COLLAPSE-type game to end and may allow the player to progress to a second level game.

As discussed above, the second level of the game may be played with items collected during the COLLAPSE-type game. Also, as discussed, these items may be hidden within elements of the grid (e.g., grid 601) and released as elements are removed. In one version of the game, items such as spins of a wheel or sticks of dynamite (a.k.a. "hotsticks") are located within elements in the grid. Items (spins, sticks, etc.) are accumulated and used in the second reveal-type game to reveal a payout or other type of prize. As shown in interface 600, there may be a prize window 606 in which prizes are awarded.

Window 606 may indicate a number of available prizes, and may include an interface control (e.g., spin control 607) that allows the player to initiate the second level of the game. Window 606 may be a part of or separate from a window that includes grid 601. After the player selects control 607, window 606 indicates what, if any, prize is won. Interface 600 may also include an indication of the number of spins or other items remaining to be played by the player in the second level game.

In the example game discussed above having one or more elements containing hidden items (e.g., safes), sticks of dynamite or other items collected may be used to uncover the hidden prizes in the second level portion of the game. For instance, winnings (e.g., cash prizes) revealed within opened safe elements are awarded to the player. In one example, the reveal of the number of sticks awarded to a player may be randomized by the client computer, with at least one stick awarded to the player to allow the player to open at least one safe.

After play of the second level game, game play is returned to another instance of the first level game (e.g., the COLLAPSE-type game). The player may, however, choose to play a different game (e.g., a card game or other game) at the conclusion of any particular game instance. The player may be permitted to play further instances of the COLLAPSE-type game, with each level of the Collapse-type game leading to a second level wherein prizes are revealed. These intermediate prize amounts that are revealed with each instance of the COLLAPSE-type game, as discussed above, may be stored in a database of the server, and provided to the client prior to or during game play. Alternatively, intermediate prize amounts may be determined at the client in a random manner (e.g., by randomly selecting a possible combination of intermediate prize amounts that total the overall prize awarded to the player). In another example, a game may be determined dynamically by the game system or client based on one or more rules. These rules may be tailored so that the overall result is revealed by the game system in an interesting way.

For instance, the ticket may have an overall prize value of $50, and the prize awarded at each instance of the COLLAPSE-type game may accumulate to form the $50 prize. There may be a finite number of combinations based on the number of game instances to achieve a $50 prize, and the actual game experience presented to the player may be a random selection of the finite outcomes. In any case, the result of each game instance is either stored at the server or is determined randomly or dynamically by the client as discussed above.

According to one aspect of the present invention, it is realized that the time at which tickets are activated (and therefore, may be played) is important. In the case of a casino-based game, where tickets are issued at the casino, it may be beneficial to include a delay between the purchase of a ticket and a possible redemption of the ticket so that the game play associated with the ticket does not compete against other games offered by the casino (e.g., floor games). For example, in the case of a slot machine game, it may be preferable that such a game be activated after the player leaves the casino, or otherwise is not playable while in the casino so as not to compete with other types of slot machine games or other game types offered by the casino.

Further, another benefit of introducing a delay between ticket issuance and activation includes increasing the likelihood that the player plays the game at another location (e.g., at home), requiring the return of the player to the ticket redemption location to redeem his/her winnings. Because the player needs to return to the redemption location (which may be a casino), the possibility that the player will purchase additional tickets or play other types of games offered at the redemption location is increased.

According to one embodiment of the present invention, a COLLAPSE-type game is conducted that may include the following additional aspects, either alone or in combination:

- The game begins with a fixed number of lines of colored elements already positioned on the game grid (e.g., grid 601) and available to be selected by the user (or player).
- New elements fill the bottom and/or the top of the screen, from left to right, one at a time, but are not available to be selected. When a row is complete, the line of elements is pushed onto the game grid and added to those elements in active play. Alternatively, new elements may fill the game grid from any edge, including from the right and/or left side.
- Selecting the preview area as lines are being formed causes the preview area to fill with elements and the elements to be added to the active play area.
- The user can clear elements from the active area by selecting any three or more same-colored elements that are touching.
- When a user positions a selection device (e.g., a mouse pointer) over a group of elements that are eligible to be cleared, the group of elements changes in appearance.

When elements are cleared, the elements above fall downward and toward the center to fill any void created by removed elements.

When the user clears an element that contains a dynamite stick (or other item) in it, that stick is placed to the right of the game board for use in the second level game (e.g., a prize round).

When the stack of elements comes within a predetermined number (e.g., three) of rows of the top of the game area, a warning area flashes.

If the elements reach the top of the game area, the COLLAPSE-type game ends and the user is taken to the second level game.

If the user collects a predetermined number (e.g., six) of dynamite sticks, the COLLAPSE-type game ends, and the user is taken to the second level game.

The user begins the game with one dynamite stick collected for him/her.

At the second level game, the user is presented with a grid, 6 by 6, of safes.

The user selects a button and the first dynamite stick is used.

The stick begins at the top left most safe and moves over each safe in turn, from left to right, top to bottom, one at a time.

The safe that the stick stops at is blown open to reveal either a cash amount or other prize type or an indication that no prize is awarded.

If multiple sticks are available for use, each subsequent stick starts at the safe immediately after the safe that was blown open.

The sticks skip over safes that have already been opened.

At the conclusion of the game, the user is presented an indication that the second level game is over and an indication of any prize(s) awarded.

The overall result (e.g., payout) for purchasing a ticket may be predetermined (as in a scratch or other type of instant lottery game) or may be determined by a later event (such as a lottery, Keno, or bingo draw) that occurs after ticket issuance.

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

What is claimed is:

1. A method for playing games of chance comprising acts of:

providing a first video gaming machine having multiple games, each of the multiple games having a non-predetermined outcome and/or a predetermined outcome;

providing for a player to play one or more games on the first video gaming machine, the one or more games having non-predetermined outcomes;

providing for a player to indicate that the player has chosen to not play remaining games already paid for on the first video gaming machine;

the first video gaming machine determining if the remaining games have predetermined outcomes; and in response to a determination that the remaining games do not have predetermined outcomes and in response to the player having indicated a choice not to play the remaining games, the first video gaming machine determining outcomes of the remaining games and providing a ticket with credit to the player to play the remaining games with predetermined outcomes, the determined outcomes being stored on the provided ticket.

2. The method according to claim 1, further comprising an act of storing the determined outcomes on at least one of a linked or networked central computer and a storage device within the first video gaming machine.

3. The method according to claim 1, wherein the provided ticket includes a ticket identifier.

4. The method according to claim 3, wherein the provided ticket further includes an access code.

5. The method according to claim 4, wherein at least one of the ticket identifier and access code is printed on the provided ticket.

6. The method according to claim 4, wherein at least one of the ticket identifier and access code is coded on the provided ticket magnetically.

7. The method according to claim 4, wherein the method further comprises acts of:

operating, by the player, a second video gaming machine;

entering, by the player, at least one of the ticket identifier and access code from the provided ticket into the second video gaming machine;

verifying, by the second video gaming machine, the at least one of entered ticket identifier and access code;

accessing, by the second video gaming machine, the outcomes for the remaining games determined by the first video gaming machine; and providing, by the second video gaming machine, the remaining games to the player according to the outcomes determined by the first video gaming machine.

8. The method according to claim 1, wherein the games of chance include one or more games from the group comprising bingo, keno, UK bingo, lotto, lottery games, baccarat and slot machines.

9. The method according to claim 1, wherein a player obtains the determined outcome of the remaining games despite how the player plays the games.

10. The method according to claim 1, wherein the first video gaming machine is located in a casino.

11. The method according to claim 1, wherein the first video gaming machine is a slot machine.

12. The method according to claim 7, wherein the second video gaming machine is located in at least one of a casino, in a different casino, in a hotel, at a racetrack, at home, and in a mobile location.

13. The method according to claim 7, wherein the second video gaming machine is one of a group comprising a slot machine, personal computer, PDA, and cellular telephone.

14. The method according to claim 13, wherein the second video gaming machine is connected to the first video gaming machine or central server by one or more of the group comprising a local area network, a wide area network, and the Internet.

15. A method for playing games of chance comprising acts of:

providing a first video gaming machine having multiple games, each of the multiple games having a non-predetermined outcome and/or a predetermined outcome;

providing for a player to play a first series of games on the first video gaming machine, the first series of games having non-predetermined outcomes;

providing for a player to indicate that the player has chosen to not play remaining games already paid for on the first video gaming machine;

the first video gaming machine determining if the remaining games have predetermined outcomes;

the first video gaming machine determining an amount of credit due the player for the remaining games and the outcomes of the remaining games in response to the player having indicated a choice not to play the remaining games and in response to a determination that the remaining games do not have predetermined outcomes;

the first video gaming machine storing the outcomes of the remaining games on a central computer, the central computer being distinct from the first gaming machine;

the first video gaming machine providing a ticket with an access code; and providing for the player to play the remaining games on a second video gaming machine, wherein the determined outcomes are accessed from the central computer using the access code provided on the ticket.

16. A method for playing games of chance comprising acts of:

providing a first video gaming machine having multiple games, each of the multiple games having a non-predetermined outcome and/or a predetermined outcome;

providing for a player to play a first series of games on the first video gaming machine, the first series of games having non-predetermined outcomes;

providing for a player to indicate that the player has chosen to not play remaining games already paid for on the first video gaming machine;

the first video gaming machine determining if the remaining games have predetermined outcomes;

a second gaming machine connected by a network to the first video gaming machine determining the outcomes of the remaining games in response to the player having indicated a choice not to play the remaining games and in response to a determination that the remaining games do not have predetermined outcomes;

at least one of the first video gaming machine and the second gaming machine storing the outcomes of the remaining games on a central computer, the central computer being distinct from the first gaming machine; and providing for the player to play the remaining games on another video gaming machine, wherein the determined outcomes are accessed from the central computer.

17. The method of claim 16, wherein the third video gaming machine is a personal computer.

18. The method of claim 1, wherein the act of determining if the remaining games have predetermined outcomes is performed on the first video gaming machine.

19. The method of claim 15, wherein the act of determining if the remaining games have predetermined outcomes is performed on the first video gaming machine.

20. The method of claim 16, wherein the act of determining if the remaining games have predetermined outcomes is performed on the first video gaming machine.

* * * * *